US011288569B2

(12) United States Patent
Lu

(10) Patent No.: US 11,288,569 B2
(45) Date of Patent: *Mar. 29, 2022

(54) VEHICLE DRIVING ASSIST SYSTEM WITH ENHANCED DATA PROCESSING

(71) Applicant: MAGNA ELECTRONICS INC., Auburn Hills, MI (US)

(72) Inventor: John Lu, Grand Blanc, MI (US)

(73) Assignee: MAGNA ELECTRONICS INC., Auburn Hills, MI (US)

(*) Notice: Subject to any disclaimer, the term of this patent is extended or adjusted under 35 U.S.C. 154(b) by 141 days.

This patent is subject to a terminal disclaimer.

(21) Appl. No.: 15/929,569

(22) Filed: May 11, 2020

(65) Prior Publication Data

US 2020/0272885 A1 Aug. 27, 2020

Related U.S. Application Data

(63) Continuation of application No. 15/586,604, filed on May 4, 2017, now Pat. No. 10,650,304.

(Continued)

(51) Int. Cl.
*G06N 3/04* (2006.01)
*B60W 30/00* (2006.01)
(Continued)

(52) U.S. Cl.
CPC ........... *G06N 3/0436* (2013.01); *B60W 30/00* (2013.01); *G05D 1/0088* (2013.01);
(Continued)

(58) Field of Classification Search
CPC ....... G06N 3/0436; G06N 7/02; B60W 30/00; G05D 1/0088; G05D 2201/0213; G06F 9/5088
(Continued)

(56) References Cited

U.S. PATENT DOCUMENTS 5,550,677 A 8/1996 Schofield et al.
5,670,935 A 9/1997 Schofield et al.
(Continued)

FOREIGN PATENT DOCUMENTS

WO WO-2008062512 A1 * 5/2008 ........... G06F 9/4881

OTHER PUBLICATIONS

English Translation: Shunsuke, WO 2008062512 A1, May 29, 2008, WIPO Patent Office Publication (Year: 2008).*

*Primary Examiner* — Nadeem Odeh

(74) *Attorney, Agent, or Firm* — Honigman LLP

(57) ABSTRACT

A vehicular driving assistance system includes an exterior viewing camera disposed at a vehicle and an ECU disposed at the vehicle for processing captured image data to detect an object exterior of the vehicle. The ECU performs processing tasks for multiple vehicle systems, including at least (i) a headlamp control system, (ii) a collision avoidance system and (iii) a lane departure warning system. Responsive to determination at the ECU that one of the multiple vehicle systems requires safety critical processing, (i) processing for that vehicle system is determined at the ECU to be a higher priority task, (ii) the ECU performs safety critical processing for that higher priority task and (iii) lower priority processing tasks are shifted from the ECU to other processors within the vehicle so that the ECU maximizes safety critical processing for that higher priority task.

23 Claims, 3 Drawing Sheets

Related U.S. Application Data

(60) Provisional application No. 62/334,505, filed on May 11, 2016.

(51) Int. Cl.
  G05D 1/00 (2006.01)
  G06F 9/50 (2006.01)
  G06N 7/02 (2006.01)

(52) U.S. Cl.
  CPC ... G06F 9/5088 (2013.01); *G05D 2201/0213* (2013.01); *G06N 7/02* (2013.01)

(58) Field of Classification Search
  USPC .......................................................... 701/27
  See application file for complete search history.

(56) References Cited

U.S. PATENT DOCUMENTS

| | | | |
|---|---|---|---|
| 5,949,331 A | 9/1999 | Schofield et al. | |
| 6,690,268 B2 | 2/2004 | Schofield et al. | |
| 6,693,517 B2 | 2/2004 | McCarthy et al. | |
| 7,580,795 B2 | 8/2009 | McCarthy et al. | |
| 8,316,605 B2 | 11/2012 | Oberg | |
| 10,650,304 B2 | 5/2020 | Lu | |
| 2006/0101465 A1 | 5/2006 | Kato et al. | |
| 2010/0199283 A1* | 8/2010 | Kido | G06F 9/485 718/103 |
| 2011/0205042 A1* | 8/2011 | Takemura | G01S 17/93 340/435 |
| 2012/0062743 A1 | 3/2012 | Lynam et al. | |
| 2012/0105637 A1 | 5/2012 | Yousefi et al. | |
| 2012/0216208 A1 | 8/2012 | Takemura et al. | |
| 2012/0218412 A1 | 8/2012 | Dellantoni et al. | |
| 2013/0222592 A1 | 8/2013 | Gieseke | |
| 2014/0218529 A1 | 8/2014 | Mahmoud et al. | |
| 2014/0222280 A1 | 8/2014 | Salomonsson et al. | |
| 2014/0322676 A1 | 10/2014 | Raman | |
| 2014/0375476 A1 | 12/2014 | Johnson et al. | |
| 2015/0124096 A1 | 5/2015 | Koravadi | |
| 2015/0158499 A1 | 6/2015 | Koravadi | |
| 2015/0251599 A1 | 9/2015 | Koravadi | |
| 2015/0352953 A1 | 12/2015 | Koravadi | |
| 2016/0036917 A1 | 2/2016 | Koravadi et al. | |
| 2016/0173858 A1 | 6/2016 | Beon et al. | |
| 2016/0210853 A1 | 7/2016 | Koravadi | |
| 2016/0351051 A1 | 12/2016 | Murthy et al. | |
| 2017/0110022 A1 | 4/2017 | Gulash | |
| 2017/0331637 A1 | 11/2017 | Lu et al. | |

* cited by examiner

VEHICLE DRIVING ASSIST SYSTEM WITH ENHANCED DATA PROCESSING

CROSS REFERENCE TO RELATED APPLICATIONS

The present application is a continuation of U.S. patent application Ser. No. 15/586,604, filed May 4, 2017, now U.S. Pat. No. 10,650,304, which claims the filing benefits of U.S. provisional application Ser. No. 62/334,505, filed May 11, 2016, which is hereby incorporated herein by reference in its entirety.

FIELD OF THE INVENTION

The present invention relates generally to a driver assistance system for a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties. Image data captured by the cameras (and other data) is processed, such as for object detection or other machine vision functions.

SUMMARY OF THE INVENTION

The present invention provides a driver or driving assistance system or vision system or imaging system for a vehicle that utilizes one or more cameras (preferably one or more CMOS cameras) to capture image data representative of images exterior of the vehicle, and provides processing of data in a manner that, responsive to a determination of a priority of various processing tasks required by one or more systems or modules or control units of the vehicle, processes a higher priority task and shifts processing of lower priority tasks to other processors or modules within the vehicle or to one or more remote processors, such as via the cloud. The system may compare real-time data and profiles from remote processors, and may utilize artificial intelligence engines for data analysis.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
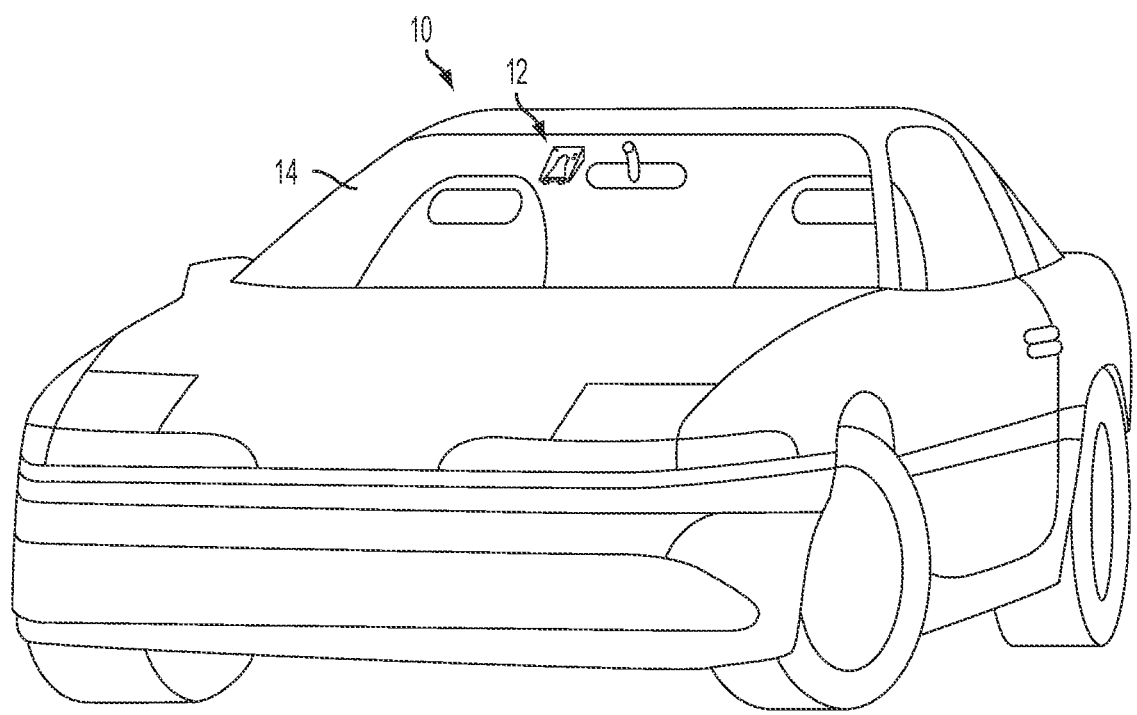
FIG. 1 is a plan view of a vehicle with a vision system that incorporates at least one camera or sensor in accordance with the present invention.

Referring now to the drawings and the illustrative embodiments depicted therein, a vehicle 10 includes an imaging system or vision system 12 that includes at least one exterior facing imaging sensor or camera, such as a forward viewing camera disposed at and behind a windshield 14 of the vehicle and viewing through the windshield and forward of the vehicle, such as for capturing image data for use with a driver assistance system of the vehicle, such as a headlamp control system, collision avoidance system, object detection system, traffic sign recognition system, lane departure warning system and/or the like (FIG. 1). Optionally the vision system may include other cameras, such as a rearward facing imaging sensor or camera at the rear of the vehicle, a forward facing camera at the front of the vehicle, and a sideward/rearward facing camera at respective sides of the vehicle, which capture images exterior of the vehicle. The vision system 10 includes a control or electronic control unit (ECU) or processor that is operable to process image data captured by the camera or cameras and may detect objects or the like and/or provide displayed images at a display device for viewing by the driver of the vehicle. The data transfer or signal communication from the camera to the ECU may comprise any suitable data or communication link, such as a vehicle network bus or the like of the equipped vehicle.

In the process of collecting and processing the substantial and growing amount of data for vehicle systems, such as driver assist systems and communication systems and the like, the demands on data bandwidth and processor speed will grow exponentially. The present invention provides a method to delay the bottle neck effect by redistributing the computation work load by:

1. For an individual vehicle:
   a. The system utilizes the under-used integrated circuits (ICs) for performance needed calculations;
   b. If a specific module calls for a specific action (such as a safety critical calculation), then the system shifts some of the lower priority tasks from that specific module to other modules within the equipped vehicle. That is, a processor may determine that one or more processors are underutilized and cause the processor(s) to process data pertaining to a determined lower priority task.
1. For platooning or system selected vehicles:
   a. Vehicle initiated—the system can process some data between the vehicles/infrastructure first, such as vehicle to vehicle (V2V) data or vehicle to infrastructure (V2X or V2I) data, then can upload data to the cloud for further processing.
   b. Cloud initiated—the cloud can also multicast commands to a group of vehicles for faster local data processing then demand results.

Figure 2:
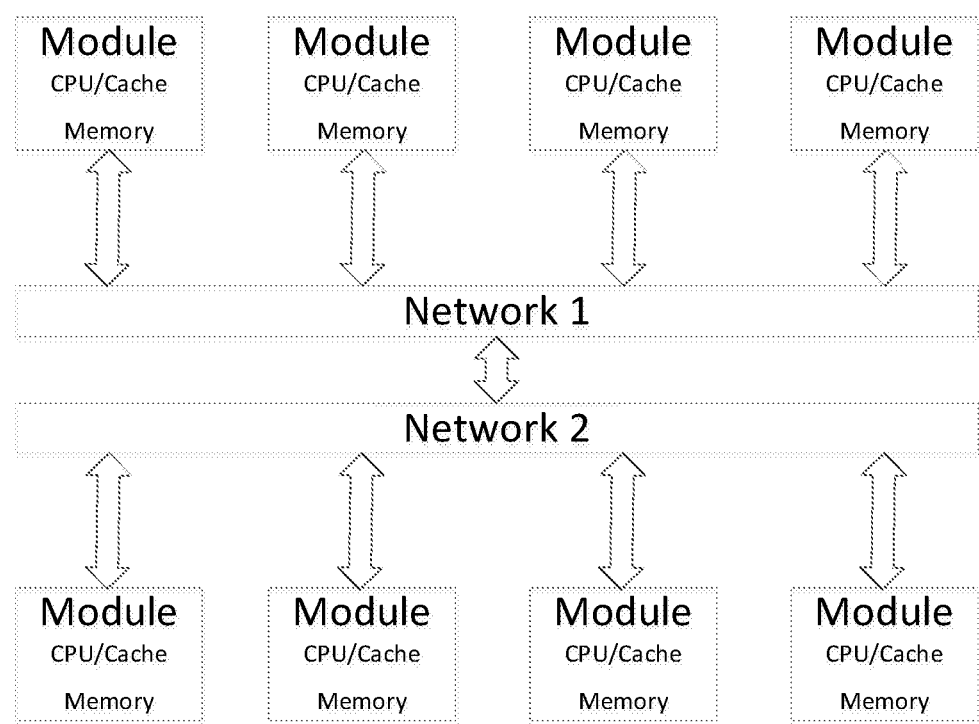
FIG. 2 is a schematic of an automotive processing system architecture for a system of the present invention.

Referring now to FIG. 2, each module of a vehicle (e.g., CPU, cache, and/or memory) is connected to a network (i.e., Network 1). Different networks may connect to other networks (e.g., Network 1 is connected with Network 2). The system and method of the present invention thus utilizes the cloud and fog and requires the cloud and fog to have a common platform in order to carry out the negotiation, data collection, load analysis, load distribution and monitoring in real-time. The potential benefits of the system and method of the present invention include extended life cycles for multiple components in the vehicle and increased performance similar to parallel processing.

Once the system has collected and processed the vehicle and driver data in the cloud/fog servers, the information will be referenced in real-time with module/driver behaviors, and in many situations, the module behavior is a reflection of human behavior.

Figure 3:
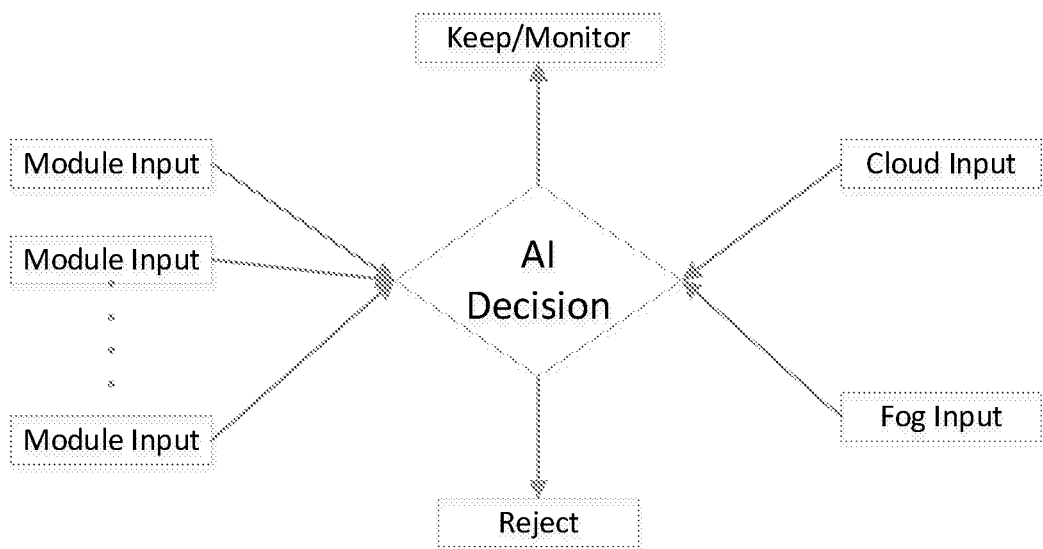
FIG. 3 is a schematic of a processing system of the present invention.

In such events, the real-time data monitoring (also collected) can be implemented with fuzzy-logic based algorithms to better mimic human behaviors. In comparing the real-time data and the profiles from servers, artificial intelligence engines can be used for analysis (FIG. 3). Multiple approaches can be processed in parallel during the learning and decision making processes, such as statistic based, fuzzy-logic based, neural network based and even artificial psychology based. The potential benefits include shorter processing timing and more precise decision making.

The system may communicate with other systems, such as via a vehicle-to-vehicle communication system or a vehicle-to-infrastructure communication system or the like. Such car2car or vehicle to vehicle (V2V) and vehicle-to-infrastructure (car2X or V2X or V2I or 4G or 5G) technology provides for communication between vehicles and/or infrastructure based on information provided by one or more vehicles and/or information provided by a remote server or the like. Such vehicle communication systems may utilize aspects of the systems described in U.S. Pat. Nos. 6,690,268; 6,693,517 and/or 7,580,795, and/or U.S. Publication Nos. US-2016-0210853; US-2014-0375476; US-2014-0218529; US-2013-0222592; US-2012-0218412; US-2012-0062743; US-2015-0251599; US-2015-0158499; US-2015-0124096; US-2015-0352953 and/or US-2016-0036917, which are hereby incorporated herein by reference in their entireties.

The system or systems of the present invention may utilize one or more cameras or sensors. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

Optionally, the camera may comprise a forward facing camera, such as disposed at a windshield electronics module (WEM) or the like. The forward facing camera may utilize aspects of the systems described in U.S. Pat. Nos. 8,256,821; 7,480,149; 6,824,281 and/or 6,690,268, and/or U.S. Publication Nos. US-2015-0327398; US-2015-0015713;

US-2014-0160284; US-2014-0226012 and/or US-2009-0295181, which are all hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or U.S. Publication Nos. US-2012-0162427; US-2006-0050018 and/or US-2006-0061008, which are all hereby incorporated herein by reference in their entireties. Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular driving assistance system, said vehicular driving assistance system comprising:
   an exterior viewing camera disposed at a vehicle equipped with said vehicular driving assistance system and viewing exterior of the vehicle;
   wherein said exterior viewing camera comprises an imager having at least one million photosensor elements;
   an electronic control unit (ECU) disposed at the vehicle;
   wherein image data captured by said exterior viewing camera is provided to and is received at said ECU;
   wherein said ECU processes received captured image data to detect an object exterior of the vehicle;
   wherein said ECU performs processing tasks for multiple vehicle systems, the vehicle systems including at least (i) a headlamp control system of the vehicle, (ii) a collision avoidance system of the vehicle and (iii) a lane departure warning system of the vehicle;
   wherein processing tasks with a higher priority are determined at said ECU to be higher priority tasks and processing tasks with a lower priority are determined at said ECU to be lower priority tasks; and
   wherein, responsive to determination at said ECU that one of the multiple vehicle systems requires safety critical processing, (i) processing for that vehicle system is determined at said ECU to be a higher priority task, (ii) said ECU performs safety critical processing for that higher priority task and (iii) lower priority processing tasks are shifted from said ECU to other processors within the vehicle so that said ECU maximizes safety critical processing for that higher priority task.

2. The vehicular driving assistance system of claim 1, wherein said ECU is operable to upload data to the cloud for processing at a remote processor.

3. The vehicular driving assistance system of claim 2, wherein said ECU uploads data pertaining to at least one determined lower priority task to the cloud for processing at the remote processor.

4. The vehicular driving assistance system of claim 1, wherein said ECU determines underutilized processors of the vehicle and causes at least one underutilized processor of the determined underutilized processors to process data pertaining to a determined lower priority task.

5. The vehicular driving assistance system of claim 1, wherein at least one determined lower priority processing task is wirelessly communicated to a remote processor for processing at the remote processor.

6. The vehicular driving assistance system of claim 5, wherein said vehicular driving assistance system receives and processes real-time data and profiles from the remote processor.

7. The vehicular driving assistance system of claim 6, wherein said vehicular driving assistance system utilizes artificial intelligence engines for data analysis of the real-time data and profiles from the remote processor.

8. The vehicular driving assistance system of claim 1, wherein said exterior viewing camera comprises one selected from the group consisting of (i) a forward viewing camera viewing at least forward of the vehicle and (ii) a rearward viewing camera viewing at least rearward of the vehicle.

9. The vehicular driving assistance system of claim 8, wherein the safety critical processing detects the object in a predicted path of travel of the vehicle.

10. The vehicular driving assistance system of claim 9, wherein said exterior viewing camera comprises the forward viewing camera viewing at least forward of the vehicle.

11. The vehicular driving assistance system of claim 10, wherein the vehicle system associated with the safety critical processing comprises the collision avoidance system of the vehicle.

12. The vehicular driving assistance system of claim 8, wherein said exterior viewing camera comprises the rearward viewing camera viewing at least rearward of the vehicle.

13. The vehicular driving assistance system of claim 1, wherein said ECU and the other processors communicate with one another via a communication network of the vehicle.

14. A vehicular driving assistance system, said vehicular driving assistance system comprising:
   a forward viewing camera disposed at a windshield of a vehicle equipped with said vehicular driving assistance system and viewing at least forward of the vehicle through the windshield;
   wherein said forward viewing camera comprises an imager having at least one million photosensor elements;
   an electronic control unit (ECU) disposed at the vehicle;
   wherein image data captured by said forward viewing camera is provided to and is received at said ECU;
   wherein said ECU processes received captured image data to detect an object forward of the vehicle;
   wherein said ECU performs processing tasks for multiple vehicle systems, the vehicle systems including at least (i) a headlamp control system of the vehicle, (ii) a collision avoidance system of the vehicle and (iii) a lane departure warning system of the vehicle;

wherein processing tasks with a higher priority are determined at said ECU to be higher priority tasks and processing tasks with a lower priority are determined at said ECU to be lower priority tasks;

wherein, responsive to determination at said ECU that one of the multiple vehicle systems requires safety critical processing, (i) processing for that vehicle system is determined at said ECU to be a higher priority task, (ii) said ECU performs safety critical processing for that higher priority task and (iii) lower priority processing tasks are shifted from said ECU to other processors within the vehicle so that said ECU maximizes safety critical processing for that higher priority task; and wherein the vehicle system associated with the safety critical processing comprises the collision avoidance system of the vehicle.

15. The vehicular driving assistance system of claim 14, wherein said ECU is operable to upload data to the cloud for processing at a remote processor, and wherein said ECU uploads data pertaining to at least one determined lower priority task to the cloud for processing at the remote processor.

16. The vehicular driving assistance system of claim 14, wherein said ECU determines underutilized processors of the vehicle and causes at least one underutilized processor of the determined underutilized processors to process data pertaining to a determined lower priority task.

17. The vehicular driving assistance system of claim 14, wherein at least one determined lower priority processing task is wirelessly communicated to a remote processor for processing at the remote processor.

18. The vehicular driving assistance system of claim 14, wherein said ECU and the other processors communicate with one another via a communication network of the vehicle.

19. A vehicular driving assistance system, said vehicular driving assistance system comprising:

a rearward viewing camera disposed at a vehicle equipped with said vehicular driving assistance system and viewing at least rearward of the vehicle;

wherein said rearward viewing camera comprises an imager having at least one million photosensor elements;

an electronic control unit (ECU) disposed at the vehicle;

wherein image data captured by said rearward viewing camera is provided to and is received at said ECU;

wherein said ECU processes received captured image data to detect an object rearward of the vehicle;

wherein said ECU performs processing tasks for multiple vehicle systems, the vehicle systems including at least (i) a headlamp control system of the vehicle, (ii) a collision avoidance system of the vehicle and (iii) a lane departure warning system of the vehicle;

wherein processing tasks with a higher priority are determined at said ECU to be higher priority tasks and processing tasks with a lower priority are determined at said ECU to be lower priority tasks;

wherein, responsive to determination at said ECU that one of the multiple vehicle systems requires safety critical processing, (i) processing for that vehicle system is determined at said ECU to be a higher priority task, (ii) said ECU performs safety critical processing for that higher priority task and (iii) lower priority processing tasks are shifted from said ECU to other processors within the vehicle so that said ECU maximizes safety critical processing for that higher priority task; and wherein the safety critical processing detects the object in a predicted rearward path of travel of the vehicle during a reversing maneuver of the vehicle.

20. The vehicular driving assistance system of claim 19, wherein said ECU is operable to upload data to the cloud for processing at a remote processor, and wherein said ECU uploads data pertaining to at least one determined lower priority task to the cloud for processing at the remote processor.

21. The vehicular driving assistance system of claim 19, wherein said ECU determines underutilized processors of the vehicle and causes at least one underutilized processor of the determined underutilized processors to process data pertaining to a determined lower priority task.

22. The vehicular driving assistance system of claim 19, wherein at least one determined lower priority processing task is wirelessly communicated to a remote processor for processing at the remote processor.

23. The vehicular driving assistance system of claim 19, wherein said ECU and the other processors communicate with one another via a communication network of the vehicle.

* * * * *